Aug. 25, 1953 R. L. HUSSEY 2,649,819
WORK SUPPORT AND CLAMP FOR DRILL PRESS TABLES
Filed Feb. 3, 1951
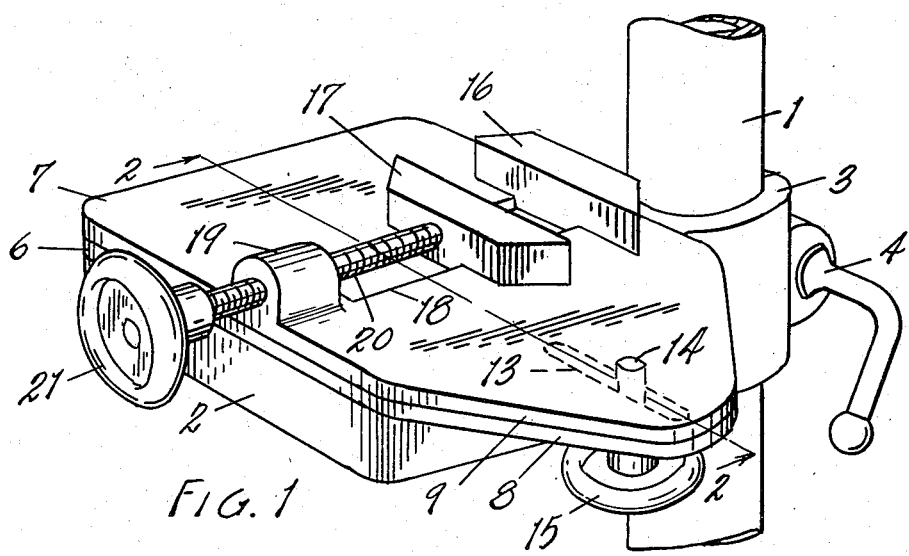
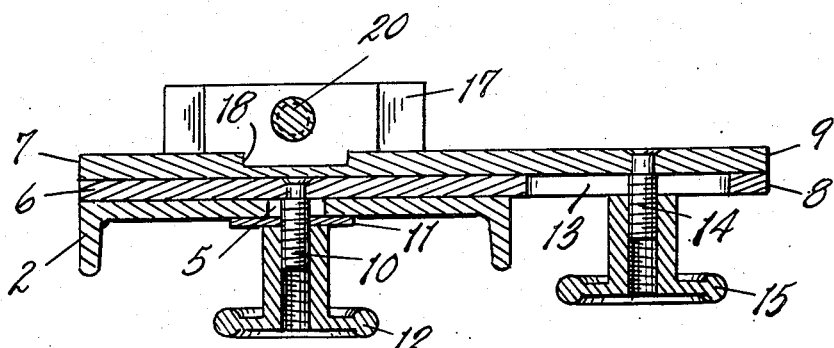
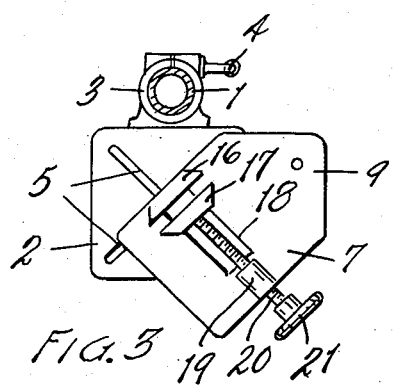
INVENTOR.
Richard L. Hussey
BY
Otta Earl
Attorney Patented Aug. 25, 1953

2,649,819

UNITED STATES PATENT OFFICE 2,649,819

WORK SUPPORT AND CLAMP FOR DRILL PRESS TABLES

Richard L. Hussey, Vicksburg, Mich., assignor to Lee Paper Company, Vicksburg, Mich.

Application February 3, 1951, Serial No. 209,275

7 Claims. (Cl. 77—63)

This invention relates to improvements in work support and clamp for drill press tables.

The principal objects of this invention are:

First, to provide a simple work holding clamp which is adjustable on the table of a drill press to permit the clamp to hold various shapes of work in the properly aligned position relative to the drill of the drill press.

Second, to provide a support for a work holding clamp which will permit the clamp to be swung away from the drill press for convenient mounting of the work in the clamp and then easily re-aligned in drilling position.

Third, to provide a support and clamp for securing work on a drill press table which permits the clamp to be universally adjusted relative to the table surface.

Other objects and advantages relating to details of my invention will be apparent from a consideration of the following description and claims.

The drawings, of which there is one sheet, illustrates a preferred form of my work support and clamp.

Fig. 1 is a perspective view of the support and clamp operatively installed in one position on the table of a drill press.

Fig. 2 is a vertical cross sectional view through the support and drill press table taken along the plane of the line 2—2 in Fig. 1.

Fig. 3 is a plan view of the work support and clamp in another adjusted position relative to the drill press table.

In the drawings, I have illustrated a portion of the column 1 of a drill press with the drill press table 2 adjustably mounted thereon by the usual form of split collar 3 and clamping screw 4. The surface of the table 2 is provided with the usual cross slots 5 as is best illustrated in Fig. 3 for the attachment of work holding devices to the table.

My work support and clamp consists of a lower plate 6 and an upper plate 7. The lower plate has a flat sliding engagement with the surface of the table 2 and the upper plate 7 has a flat slidable engagement with the lower plate 6. The body portions of the plates 6 and 7 are of substantial size to adequately support various types of work and are desirably approximately the same size as the table 2. At the right sides of the plates 6 and 7, I have provided integral tapered extension portions 8 and 9 which project beyond the side of the table 2. Desirably, the plates 6 and 7 and their extensions 8 and 9 are identical in outline and smoothly finished so that they may easily be brought into accurate overlapping alignment by feeling the lapped edges of the plates along opposite corners thereof. The tapered shape of the extensions 8 and 9 facilitates this rapid alignment of the plates.

The lower plate 6 is provided with a depending threaded stud 10 which is passed through the slotted portion 5 of the table in any desired position and with the lower plate 2 in any angularly rotated position as desired. A washer 11 and clamping nut 12 are mounted on the stud 10 below the table to clamp the lower plate in adjusted position. The side extension 8 of the lower plate defines a laterally extending slot 13.

The upper plate 7 is provided with a depending threaded stud 14 on its side projection 9 and the stud 14 is adjustably positioned in the slot 13. A second clamping nut 15 engages the lower end of the stud 14 to selectively clamp the upper plate to the lower plate. The upper plate carries a fixed work holding abutment or jaw 16 and a movable jaw 17 for clamping the work to the top of the upper plate. The jaws 16 and 17 may take the form of various types of vises or other clamping devices and the example of work holding structure illustrated is intended only as a simple and inexpensive form of clamp. The particular clamp illustrated includes a longitudinal slot 18 in the top of the plate for guiding the movable jaw 17 and locating the fixed jaw 16. An internally threaded ear 19 on the forward edge of the top plate engages the clamping screw 20 for advancing and retracting the movable jaw 17. A hand wheel 21 on the forward end of the screw 20 permits easy adjustment of the movable jaw.

The adjustable connections provided by the threaded studs and the clamping nuts 12 and 15 permit the fixed jaw 16 to be located in any desired position on the table 2 to properly locate the work under the drill of the drill press. As has previously been indicated, the releasable connection between the upper and lower plates provided by the clamping nut 15 permits the upper plate and fixed jaw 16 to be swung away from the drill of the press for adjustment, re-alignment or hand work on the work piece 6 and the similar outlines of the upper and lower plates permit rapid and accurate re-alignment of the fixed jaw to its adjusted working position. The work support is simple and relatively inexpensive in that it is only necessary to use reasonable accuracy in forming the flat mating surfaces of the two plates and in forming the peripheries of the plates to the same size and contour.

Having thus described my invention, what I claim as new and desire to secure by Letters Patents is:

1. An adjustable work support for a drill press table comprising upper and lower plates having flat sliding engagement, said plates having body portions approximating the size of a drill press table and outwardly tapering projections on one side thereof, said plates and projections having their peripheries shaped to the same contour and size, a threaded stud depending from the body portion of said lower plate to extend through an aperture in a drill press table, a hand nut and washer engageable with said stud to clamp said lower plate to the table, the side projection of said lower plate defining a laterally extending slot, a second threaded stud depending from the projection on said upper plate and extending through said slot, a second hand nut engageable with said second stud to releasably clamp said plates together, and work clamping means including fixed and movable jaws mounted on the top of said upper plate.

2. An adjustable work support for a drill press table comprising upper and lower plates having flat sliding engagement, said plates having body portions approximating the size of a drill press table and outwardly extending projections on one side thereof, said plates and projections having their peripheries shaped to the same contour and size, a threaded stud depending from the body portion of said lower plate to extend through an aperture in a drill press table, a hand nut engageable with said stud to clamp said lower plate to the table, the side projection of said lower plate defining a slot, a second threaded stud depending from the projection on said upper plate and extending through said slot, a second hand nut engageable with said second stud to releasably clamp said plates together, and work clamping means including fixed and movable jaws mounted on the top of said upper plate.

3. An adjustable work support for a drill press table comprising upper and lower plates having flat sliding engagement, said plates having body portions approximating the size of a drill press table and outwardly extending projections on one side thereof, said body portions and projections having at least portions of their peripheries at opposite sides thereof shaped to the same contour and size, a threaded stud depending from the body portion of said lower plate to extend through an aperture in a drill press table, a hand nut engageable with said stud to clamp said lower plate to the table, the side projection of said lower plate defining a laterally extending slot, a second threaded stud depending from the projection on said upper plate and extending through said slot, a second hand nut engageable with said second stud to releasably clamp said plates together, and work clamping means including fixed and movable jaws mounted on the top of said upper plate.

4. An adjustable work support for a drill press table comprising upper and lower plates having flat sliding engagement, said plates having body portions approximating the size of a drill press table and outwardly extending projections on one side thereof, said body portions and projections having at least portions of their peripheries shaped to the same contour and size, a threaded stud depending from the body portion of said lower plate to extend through an aperture in a drill press table, a hand nut engageable with said stud to clamp said lower plate to the table, the side projection of said lower plate defining an aperture, a second threaded stud depending from the projection on said upper plate and extending through said aperture, a second hand nut engageable with said second stud to releasably clamp said plates together, and work clamping means including fixed and movable jaws mounted on the top of said upper plate.

5. An adjustable work support for a machine tool table comprising upper and lower plates having parallel sliding engagement, said plates having body portions adapted to overlie the table and projections of reduced width on one side thereof, said plates having at least portions of their peripheries at opposite sides thereof shaped to the same contour and size, a threaded stud depending from the body portion of said lower plate to extend through an aperture in a table, a hand nut engageable with said stud to clamp said lower plate to the table, the side projection of said lower plate defining an aperture, a second threaded stud depending from the projection on said upper plate and extending through said aperture, a second hand nut engageable with said second stud to releasably clamp said plates together, and work clamping means including fixed and movable jaws mounted on the top of said upper plate.

6. An adjustable work support for a machine tool table comprising upper and lower plates having parallel sliding engagement, said plates having body portions adapted to overlie the table and projections on one side thereof, said plates having at least portions of their peripheries at opposite sides thereof shaped to the same contour and size, a stud depending from the body portion of said lower plate to extend through an aperture in a table, a clamp means engageable with said stud to clamp said lower plate to the table, the side projection of said lower plate defining an aperture, a second stud depending from the projection on said upper plate and extending through said aperture, a second clamp means engageable with second stud to releasably clamp said plates together, and work clamping means mounted on the top of said upper plate.

7. An adjustable work support for a machine tool table comprising upper and lower plates having parallel sliding engagement, said plates having body portions adapted to overlie the table and projections on one side thereof, a stud depending from the body portion of said lower plate to extend through an aperture in a table, clamp means engageable with said stud to clamp said lower plate to the table, the side projection of said lower plate defining an aperture, a second stud depending from the projection on said upper plate and extending through said aperture, a second clamp means engageable with said second stud to releasably clamp said plates together, and work clamping means mounted on the top of said upper plate.

RICHARD L. HUSSEY.

References Cited in the file of this patent
UNITED STATES PATENTS

| Number | Name | Date |
| --- | --- | --- |
| 510,648 | Moore | Dec. 12, 1893 |
| 793,892 | Miller et al. | July 4, 1905 |